United States Patent [19]

Neti et al.

[11] 3,881,869

[45] May 6, 1975

[54] CHEMILUMINESCENT DETECTION OF OZONE

[75] Inventors: Radhakrishna Murty Neti, Brea; George I. Reeves, Fullerton, both of Calif.

[73] Assignee: Beckman Instruments, Inc., Fullerton, Calif.

[22] Filed: July 2, 1973

[21] Appl. No.: 375,481

[52] U.S. Cl. .......... 23/232 E; 23/232 R; 23/254 R; 23/254 E
[51] Int. Cl. .......................................... G01n 31/10
[58] Field of Search.......... 23/232 E, 254 E, 232 R, 23/254 R

[56] References Cited
UNITED STATES PATENTS

| | | | |
|---|---|---|---|
| 3,679,312 | 7/1972 | Mansberg | 23/230 B |
| 3,692,485 | 9/1972 | Neti et al. | 23/232 E |
| 3,712,793 | 1/1973 | Lyshkow | 23/254 E |

*Primary Examiner*—Barry S. Richman
*Assistant Examiner*—Dale Lovercheck
*Attorney, Agent, or Firm*—R. J. Steinmeyer; P. R. Harder

[57] ABSTRACT

The concentration of ozone in a gas sample, such as ambient air, can be quantitatively measured by contacting the gas sample with an organic polymer having a backbone chain consisting of carbon atoms to produce a chemiluminescent reaction and measuring the intensity of light emitted by the reaction. The polymer undergoes no apparent chemical change, indicating that it functions as a catalyst in the chemiluminescent reaction.

7 Claims, 2 Drawing Figures

PATENTED MAY 6 1975  3,881,869

CHEMILUMINESCENT DETECTION OF OZONE

In accordance with this invention, the concentration of ozone in a gas sample can be quantitatively measured by contacting the gas sample with an organic polymer to produce a chemiluminescent reaction and measuring the intensity of the light emitted by the reaction. The polymer undergoes no significant chemical change as a result of contact with ozone. After prolonged use the efficiency of the polymer may decline, but the efficiency may be restored by contacting the polymer with ozone-free air for a period until the efficiency is restored. This period is normally less than one hour.

This invention is particularly applicable to the situation where the concentration of the ozone in the gas sample is between about 0.001 and 100 parts per million.

As used herein, the term "organic polymer" refers to polymers wherein most of the atoms in the backbone chain are carbon atoms. While some polymers perform better than others, no organic polymer has been found to be inoperable. In general, synthetic polymers are preferred. The molecular weight of the polymer is preferably at least 2000.

A suitable apparatus for carrying out the method of the invention comprises a reaction cell having inlet and outlet passages leading to a reaction chamber partially filled with an organic polymer, in combination with means for measuring the intensity of light emitted by a chemiluminescent reaction in the chamber. The chamber is referred to as being partially filled with the polymer to indicate that there is sufficient space in the chamber to permit flow of the gas sample through the chamber.

Figure 1:
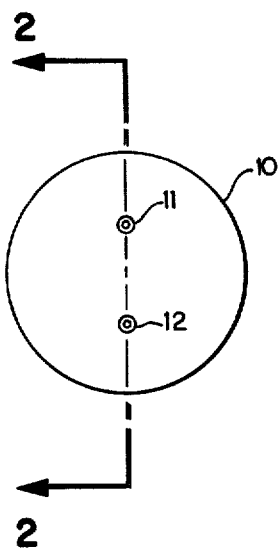
FIG. 1 is a top view of a suitable reaction cell.
Figure 2:
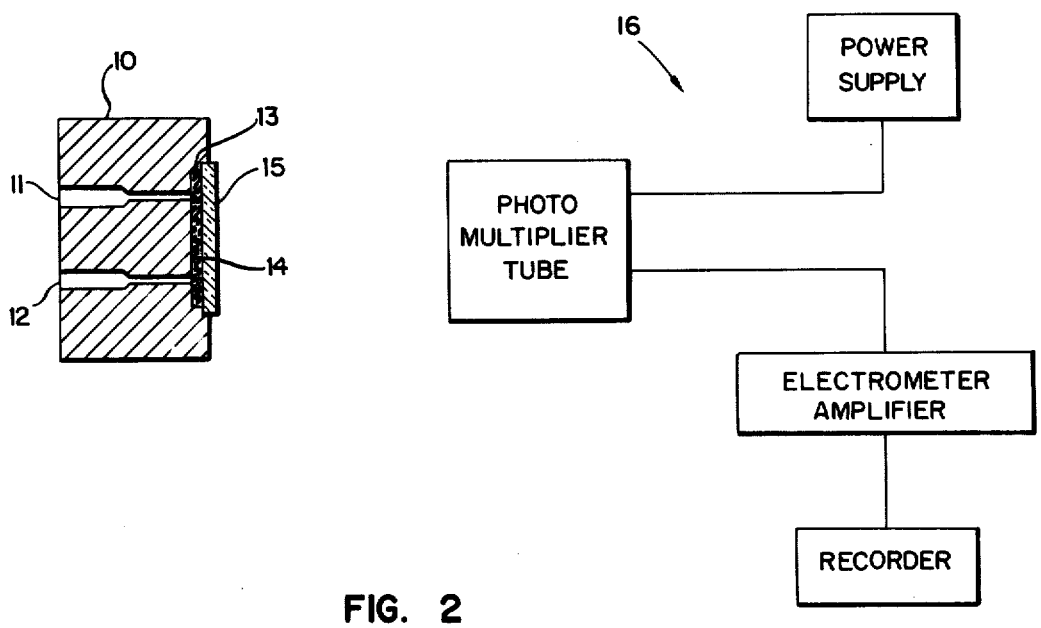
FIG. 2 is a sectional side view of the cell taken along line 2—2 of FIG. 1, and a diagram of means for measuring light intensity.

The cell 10 comprises an inlet passage 11 and an outlet passage 12 leading to a reaction chamber 13. Particles of an organic polymer 14 partially fill the chamber 13. A window 15 is positioned in a wall of the chamber such that the intensity of light emitted by a chemiluminescent reaction in the chamber can be measured. Suitable means for measuring the light intensity, indicated at 16, include a photoelectric detector (such as a photomultiplier tube) spaced from the window 15, as shown, a power supply connected to the photoelectric detector, an electrometer amplifier connected to the photoelectric detector for amplifying an electrical signal produced by the photoelectric detector as a result of the chemiluminescent reaction, and an ammeter or recorder for displaying the amplified signal.

A gas sample containing ozone is admitted through the inlet passage 11 to the reaction chamber 13, where it contacts the organic polymer 14. The light emitted by the chemiluminescent reaction is transmitted through the window 15 and its intensity is measured by the means 16. The intensity of the light is directly related to the concentration of ozone in the gas sample.

EXAMPLES

The chamber of a reaction cell was filled with particulate polyethylene having a molecular weight of about 3500. Samples of air containing 0.25 ppm of ozone were passed through the reaction cell at the flow rates indicated in Table I, which also indicates the signal recorded at each flow rate.

TABLE I

| Flow Rate, cc/min. | Signal, amperes × $10^{-10}$ |
|---|---|
| 100 | 0.4 |
| 200 | 0.8 |
| 400 | 2.5 |
| 600 | 4.8 |
| 800 | 7 |
| 930 | 8.1 |

Samples of air containing the concentrations of ozone indicated in Table II were passed through the reaction cell at a flow rate of 500 cc/min. The signal recorded at each concentration for this fixed flow rate is also indicated in Table II.

TABLE II

| Concentration, ppm | Signal, amperes × $10^{-10}$ |
|---|---|
| 0.5 | 5.6 |
| 0.25 | 2.8 |
| 0.20 | 2.4 |
| 0.17 | 1.9 |

To test the useful life of the apparatus, air containing 140 ppm of ozone was passed through the reaction cell at a rate of 100 cc/min. for 18 hours. A constant signal was recorded during the first 12 hours, and a 20 percent reduction in the signal was recorded after the next 6 hours. However, the reduction in signal was completely corrected by passing ozone-free air through the cell for less than one hour.

The polyethylene in the chamber was replaced with the polymers indicated in Table III. The signal recorded using each polymer at a flow rate of 100 cc/min. of air containing 100 ppm of ozone is also indicated in Table III.

TABLE III

| Polymer | Signal, amperes × $10^{-8}$ |
|---|---|
| Polyethylene (7000 molecular weight) | 11 |
| Polypropylene | 1.8 |
| Polytetrafluoroethylene (Teflon T-5) | 8 |
| Polytetrafluoroethylene (Teflon T-6) | 12 |
| Acrylonitrile-butadiene-styrene polymer | 0.6 |
| Polymethylmethacrylate | 2 |
| Chlorinated polyether (Penton) | 0.5 |
| Carboxymethyl cellulose | 0.1 |
| Polyester (Dynel) | 0.5 |

The wide variety of polymers found to be suitable indicates that virtually any organic polymer would be suitable. However, preferred results were obtained with polyethylene and polytetrafluoroethylene.

It is known that the concentration of ozone in a gas sample can be measured by contacting the sample with ethylene to produce a chemiluminescent reaction according to the following equation:

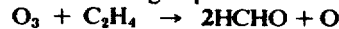

$$O_3 + C_2H_4 \rightarrow 2HCHO + O$$

The signal generated by the reaction is about 10 times the signal obtained using polyethylene. However, unlike the reaction between ozone and an organic polymer in accordance with this invention, the reaction between ethylene and ozone is irreversible and the ethylene is consumed. Other drawbacks of employing ethylene are (1) ethylene is a fire hazard, (2) high concentrations are toxic to plants and animals, (3) ethylene gradually polymerizes, causing obstruction of passages, and (4) the necessity of providing a source of ethylene makes the instrument less portable. These drawbacks of employing ethylene are overcome by the present invention.

What is claimed is:

1. A method of quantitatively measuring the concentration of ozone in a gas sample, which method comprises:

contacting a bed of solid particles of an organic polymer having a backbone chain consisting of carbon atoms with an ozone containing gas sample to produce chemiluminescence, and measuring the intensity of the chemiluminescent light.

2. The method of claim 1 wherein the amount of ozone in the gas sample is between about 0.001 and 100 parts per million.

3. The method of claim 1 including the steps of restoring the efficiency of the polymer after prolonged repeated use in the method by contacting the polymer with ozone-free air.

4. The method of claim 3 wherein the molecular weight of the polymer is at least 2000.

5. The method of claim 4 wherein the polymer is synthetic.

6. The method of claim 5 wherein the polymer is polyethylene or polytetrafluoroethylene.

7. The method of claim 6 wherein the intensity of light is measured photoelectrically.

* * * * *